O. W. Stow,

Tinsmith's Shears.

No. 103,386. Patented May 24, 1870.

Witnesses.
H. B. Dodge
C. A. Shepard.

Inventor.
Orson W. Stow.
By James Shepard Atty

United States Patent Office.

ORSON W. STOW, OF PLANTSVILLE, CONNECTICUT.

Letters Patent No. 103,386, dated May 24, 1870.

IMPROVEMENT IN TINSMITHS SHEARS.

The Schedule referred to in these Letters Patent and making part of the same.

I, ORSON W. STOW, of Plantsville, in the county of Hartford and State of Connecticut, have invented certain new and useful Improvements in Tinsmiths' Shears, of which the following is a specification.

My invention consists in the employment of a clamp-nut formed in the handle of a tinsmith's shears, and of a set-screw passing through said nut, in such a manner that its end will strike the opposite handle and regulate the closing of the blades of said shears.

In the accompanying drawing—

Figure 1:
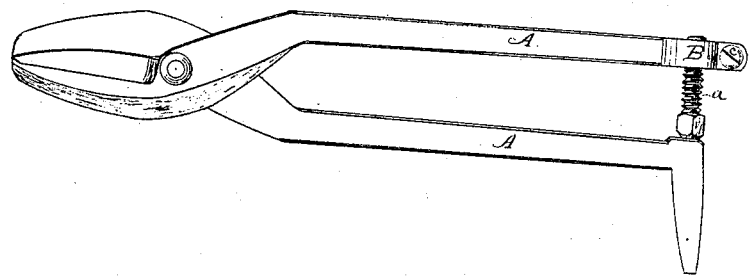

Figure 1 is a side elevation of a pair of shears of my invention, and

Figure 2:

Figure 2, a top view of the same.

It is well known that if the points of shear-blades are allowed to pass each other when cutting metal plates, each point crowds the metal in opposite directions, and thus causes it to tear or break for a short distance immediately beyond the end of the cut in said plate. To adjust tinsmiths'-shears so that the points of the blade shall meet without passing each other is the object of my invention.

Through a portion of one of the handles A A, preferably the upper one, I make a hole, and properly thread the same to receive a set-screw, $a$.

The handle so drilled and threaded is also slit, at $b$, and provided with a set-screw, $c$, by which the slit $b$ can be closed, thus forming a portion of the handle into an ordinary clamp-nut, B.

One end of the screw $a$ rests on the handle opposite the one to which said screw is secured, so that the closing distance between the handles A A, and, consequently, the points of shear-blades, can be adjusted as required.

After the blades are properly adjusted, the set-screw $c$ is turned inward, so that the clamp-nut B shall firmly gripe the set-screw $a$ and hold it securely, and so immovable in its place that it can only be moved by design.

I claim as my invention—

As a new article of manufacture, the improved tinsmiths'-shears herein shown and described.

ORSON W. STOW.

Witnesses:
FREDERICK SUTLIFF,
JAMES SHEPARD.